Patented Jan. 3, 1928.

1,654,548

UNITED STATES PATENT OFFICE.

WHARTON B. McLAUGHLIN, OF NEW YORK, N. Y.; CELIA BROWN McLAUGHLIN ADMINISTRATRIX OF SAID WHARTON B. McLAUGHLIN, DECEASED.

CHOCOLATE.

No Drawing. Application filed December 5, 1923. Serial No. 678,780.

The object of my invention is by adding a vegetable substance to produce a chocolate of improved flavor and digestibility.

I accomplish this object by adding the vegetable substance or extract in solution in a highly concentrated hot sugar solution to a fatted or partially defatted cocoa mass in the form of a powder, mixing the two thoroughly in a melangeur, exposing the semi-solid mass form in thin sheets in a drying chamber (held between 140° and 160° F.) until thoroughly dry, grinding the resultant chip with the cocoa originally removed from the cocoa mass or additional cocoa mass, finishing the resultant mixture in the usual manner into chocolate.

The word vegetable is used in this application in contradistinction to animal.

The preferred vegetable extract is of an albuminous nature and is obtained from cocoanut.

The process described is an improved form of that patented by A. Denayer (German Patent 112,220, patented February 4th, 1899), which forms the basis of all successful milk chocolate manufacture.

The attempts heretofore made to combine vegetable extracts and cocoa mass have not substantially improved the texture or the chocolate flavor.

The method preferred in the manufacture of my improved chocolate is to take cocoanuts, break them, remove the kernels and the contained water, heat the mixture in a closed jacketed kettle for about an hour, then grind and press the juice from it. The fat is removed from the resultant milk by a centrifugal separator and used for the manufacture of oil, the remaining albuminous fluid is mixed with sugar and concentrated either over an open fire or, preferably, in vacuo until just ready to grain, when it is dropped into a melangeur, which contains cocoa mass, either fatted or partially defatted, but in the form of a powder and the two thoroughly rubbed together; the stiff semi-solid paste form is spread into thin layers and placed in a ventilated hot room, kept at about 160° F. until thoroughly dried.

If the above described operations have been properly carried out, the resultant mass microscopically examined will be found to be of light chocolate color, to be but little heavier than cocoa mass, to be almost as hard as barley sugar, and to present no evidence whatever (a greasy look, etc.) of the contained fat. Microscopically it will be found to consist of a dried emulsion, having extremely minute globules of fat encased in envelopes consisting of albumin and sugar. This is my improved product, which is an essential factor in the production of my improved chocolate.

My improved chocolate is made by reducing the above product to a fine powder, thoroughly incorporating it with the cocoa mass or cocoa butter, or a mixture of the two, and finishing in the usual manner into chocolate.

The product produced by this process is analogous and equal in texture, fluidity under heat and stability of the mixture to the highest grade milk chocolate, but can be made at a less cost.

Having now described my invention, that which I claim as new, on which I desire to secure Letters Patent is:

1. A new article of manufacture comprising a mixture of a cocoa mass; albuminous matter extracted from cocoanut; and sugar.

2. A new article of manufacture comprising a cocoa mass having distributed throughout the same globules of cocoa encapsulated in an admixture of an edible vegetable albumin and sugar.

3. A new article of manufacture comprising a cocoa mass having intimately admixed therewith globules of cocoa encapsulated in an admixture of albumin, derived from cocoanut, and sugar.

4. That method of producing a food product presenting the physical characteristics of high grade milk chocolate which consists in mixing an edible vegetable albumin with sugar; admixing with the mass thus formed powdered cocoa; drying the resulting body; and thereafter grinding the dried body with a cocoa mass.

5. That method of producing a food product presenting the physical characteristics of high grade milk chocolate comprising the following steps; producing a fat free from albuminous liquid from cocoanut; adding the same to sugar and concentrating the two; admixing the concentrated mass with a mass of powdered cocoa and subjecting the admixture to a rubbing action; drying the rubbed mass; and thereafter grinding the dried substance with a body of cocoanut.

Signed at city of New York, in the county of New York and State of New York this fourth day of December, A. D. 1923.

WHARTON B. McLAUGHLIN.